United States Patent
Karamchedu et al.

(10) Patent No.: US 6,788,674 B1
(45) Date of Patent: Sep. 7, 2004

(54) METHOD AND APPARATUS FOR ESTABLISHING A COLLECT CALL ORIGINATED THROUGH A PACKET BASED NETWORK

(75) Inventors: Murali Karamchedu, Beaverton, OR (US); Jeffrey B. Sponaugle, Hillsboro, OR (US)

(73) Assignee: ITXC, Inc., Princeton, NJ (US)

( * ) Notice: Subject to any disclaimer, the term of this patent is extended or adjusted under 35 U.S.C. 154(b) by 92 days.

(21) Appl. No.: 09/910,679

(22) Filed: Jul. 20, 2001

(51) Int. Cl.$^7$ ............................................. H04L 12/66
(52) U.S. Cl. ..................... 370/352; 370/261; 370/356; 379/93.01; 379/210.01; 379/114.21
(58) Field of Search ................. 379/210.01, 114.21, 379/114.22, 114.23, 93.01; 370/260, 261, 352, 353, 356

(56) References Cited

U.S. PATENT DOCUMENTS

| | | | | |
|---|---|---|---|---|
| 4,933,966 A | * | 6/1990 | Hird et al. .................. | 379/132 |
| 5,818,836 A | * | 10/1998 | DuVal ........................ | 370/389 |
| 5,943,399 A | * | 8/1999 | Bannister et al. ........ | 379/88.17 |
| 5,995,608 A | * | 11/1999 | Detampel et al. ...... | 379/205.01 |
| 6,026,087 A | * | 2/2000 | Mirashrafi et al. .......... | 370/389 |
| 6,148,067 A | * | 11/2000 | Leipow .................. | 379/201.01 |
| 6,175,619 B1 | * | 1/2001 | DeSimone ............. | 379/202.01 |
| 6,188,756 B1 | * | 2/2001 | Mashinsky ............. | 379/207.04 |
| 6,307,928 B1 | * | 10/2001 | Yamasaki .............. | 379/210.01 |
| 6,377,576 B1 | * | 4/2002 | Zwick et al. ................ | 370/389 |
| 6,430,282 B1 | * | 8/2002 | Bannister et al. ....... | 379/211.02 |
| 6,563,914 B2 | * | 5/2003 | Sammon et al. ....... | 379/202.01 |
| 6,564,261 B1 | * | 5/2003 | Gudjonsson et al. ....... | 709/227 |
| 2001/0026609 A1 | * | 10/2001 | Weinstein et al. ....... | 379/93.01 |

\* cited by examiner

*Primary Examiner*—Duc Ho
*Assistant Examiner*—Michael J Molinari
(74) *Attorney, Agent, or Firm*—Kaplan & Gilman, LLP

(57) ABSTRACT

A method and apparatus for establishing a collect call originated through a packet based network is provided. In accordance with various embodiments of the invention, a system is described that facilitates voice communication between a calling party and a party to be called while the costs of the communication session are charged to the called party. In one embodiment, the called party is queried as to whether they wish to accept the costs associated with the pending voice communication session, prior to the two parties being placed in voice communication with each other.

1 Claim, 8 Drawing Sheets

PAYMENT INFORMATION ✕

SELECT PAYMENT METHOD

BILL TO ACCOUNT ☐

BILL TO CREDIT CARD ☐

ENTER ACCOUNT NAME

[ ▼ ]

ENTER PASSWORD

[ ]

ENTER CREDIT CARD NUMBER

[ ]

ENTER EXPIRATION DATE

[ JAN ▼ ]  [ 00 ▼ ]

[ CONTINUE ]   [ CANCEL ]

FIG. 6

```
<Ptt Token>
    <CALLER NAME> John Smith </CALLER NAME>
    <CALL1 TYPE> PSTN </CALL1 TYPE>
    <CALLER PN> 408-555-6789 </Caller PN>
    <CALLEE NAME> MD Smith </CALLEE NAME>
    <CALL2 TYPE> PSTN </CALL2 TYPE>
    <CALLEE ID> 503-555-2468 </CALLEE ID>
</Ptt Token>

<Ptt Token>
    <CALLER NAME> John Smith </CALLER NAME>
    <CALL1 TYPE> VOIP </CALL1 TYPE>
    <CALLER IP> 128.256.1.2 </Caller IP>
    <CALLEE NAME> MD Smith </CALLEE NAME>
    <CALL2 TYPE> PSTN </CALL2 TYPE>
    <CALLEE ID> 503-555-2468 </CALLEE ID>
</Ptt Token>
```

FIG. 8

METHOD AND APPARATUS FOR ESTABLISHING A COLLECT CALL ORIGINATED THROUGH A PACKET BASED NETWORK

BACKGROUND OF THE INVENTION

1. Field of the Invention

The invention relates generally to the field of telecommunications and, in particular to a method and apparatus for establishing a collect call originated through a packet based network.

2. Background Information

Numerous advances have recently been made in the area of telecommunications. In particular, the field of Internet telephony has emerged as a viable technology that continues to evolve at a startling rate. Such evolution is forcing traditional telecommunications practices to be supplemented and even replaced by new Internet-centric communications paradigms.

For example, various products on the market provide individuals with the ability to participate in voice communication with one another using a personal computer equipped with a communication protocol known as Voice over IP (VOIP), where the IP refers to the well-known Internet protocol. The Internet Protocol (IP) is a protocol utilized throughout the Internet to interleave and transmit data packets so as to best utilize the available bandwidth at any given time. VOIP is a term used to describe a set of services for managing the delivery of voice information using the Internet protocol. That is, the Internet provides the "switching" architecture for the system, while each computer acts as the "handset", or the audio interface for the caller/callee.

The recent proliferation of personal computers and Internet-accessible appliances has brought about the desire to integrate both function and features of the Internet with that of the PSTN (publicly switched telephone network). U.S. Pat. No. 6,026,087, titled "Method and Apparatus for Establishing a Voice Call to a PSTN Extension for a Networked Client Computer" (having a common assignee with the present application) addresses the need for bridging functionality of Internet and packet based devices with that of conventional PSTN handsets. Accordingly, a user of a networked computer can place a voice, call to a PSTN extension (equipped with merely a conventional handset) rather than being limited to placing a voice call to only VOIP equipped hardware. Although this goes a long way towards integrating the VOIP functionality of the Internet with the PSTN, further integration remains desirable.

More specifically, despite the progress made to date in integrating the two communication networks, some desirable features currently available through traditional telephone communication networks remain conspicuously absent from Internet telephony. One such feature missing from Internet telephony is the ability for a calling party to initiate an Internet based call to a callee with the callee being assessed any communication charges associated with such a call.

BRIEF DESCRIPTION OF THE DRAWINGS

The present invention will be described by way of exemplary embodiments, but not limitations, illustrated in the accompanying drawings in which like references denote similar elements, and in which:

FIG. 6 illustrates an exemplary graphical dialog through which a callee may provide billing information against which the costs of a preauthorized communication session may be charged;

FIG. 8 illustrates an exemplary XML data structure representing an electronic token according to one embodiment of the present invention.

DETAILED DESCRIPTION

In the following description, for purposes of explanation, specific numbers, materials and configurations are set forth in order to provide a thorough understanding of the invention. It will be apparent, however, to one skilled in the art that the invention may be practiced without these specific details. In some instances, structures and devices are shown in block diagram form in order to avoid obscuring the invention. In other instances, well-known features are omitted or simplified in order not to obscure the present invention. For ease of understanding, certain method steps are delineated as separate steps, however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A method and apparatus for establishing a collect call originated through a packet based network is disclosed herein. In accordance with various embodiments of the invention, a system is described that facilitates voice communication between a calling party and a party to be called while the costs of the communication session are charged to the called party. In one embodiment, the called party is queried as to whether they wish to accept the costs associated with the pending voice communication session, prior to the two parties being placed in voice communication with each other.

Figure 1:
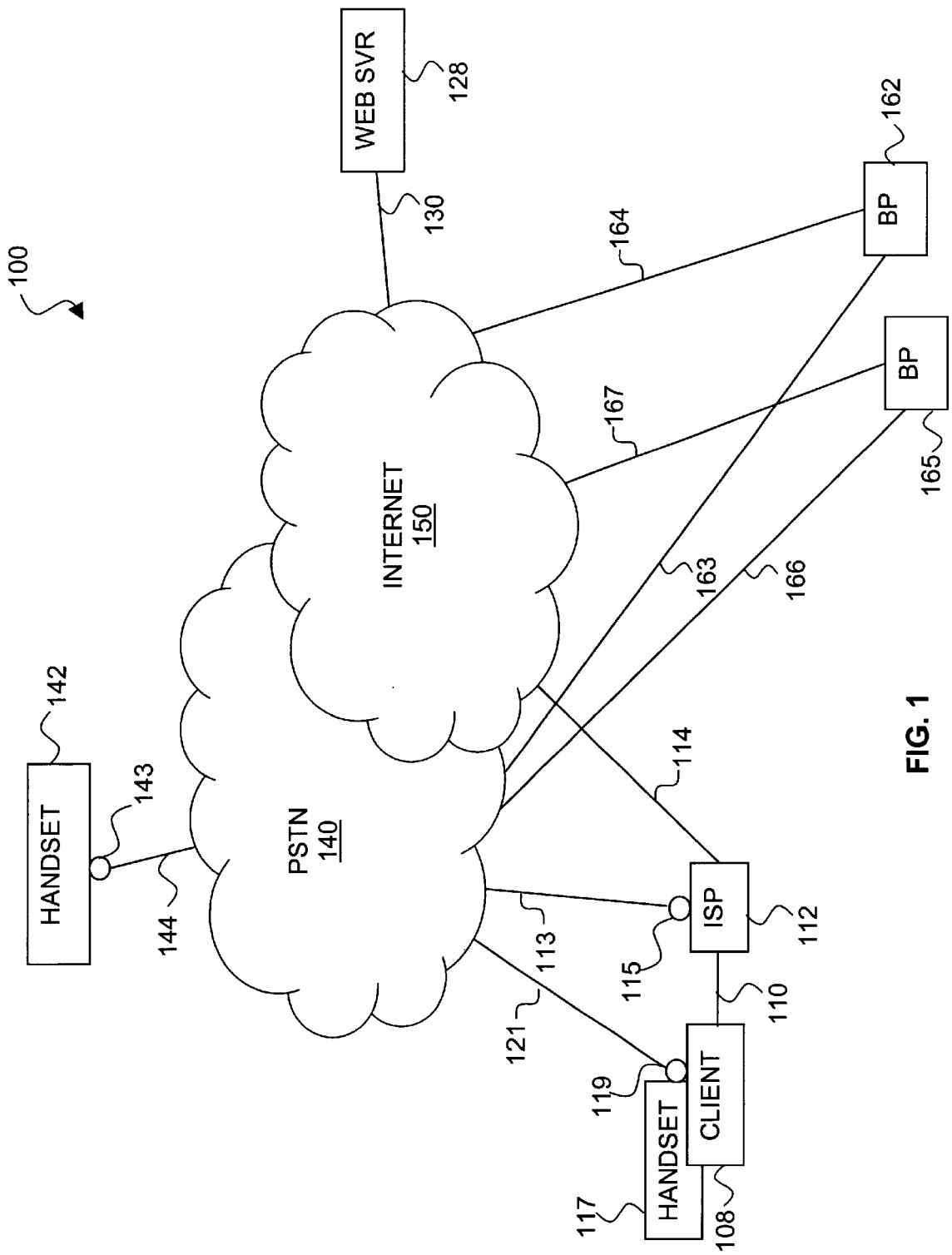
FIG. 1 is a block diagram illustrating an exemplary communication system incorporating the teachings of the present invention, in accordance with one embodiment.

In FIG. 1, a block diagram is presented illustrating an exemplary communication system 100 incorporating the teachings of the present invention. While the present invention will be described in the context of this exemplary communication system, based on the descriptions to follow, those skilled in the art will appreciate that the present invention is not limited to this embodiment. Referring now to FIG. 1, client 108, handsets 117 and 142, web server 128, and bridge servers (hereinafter "bridgeports") 162 and 165 are communicatively coupled to each other by way of PSTN 140 and Internet 150 as shown.

Figure 7:
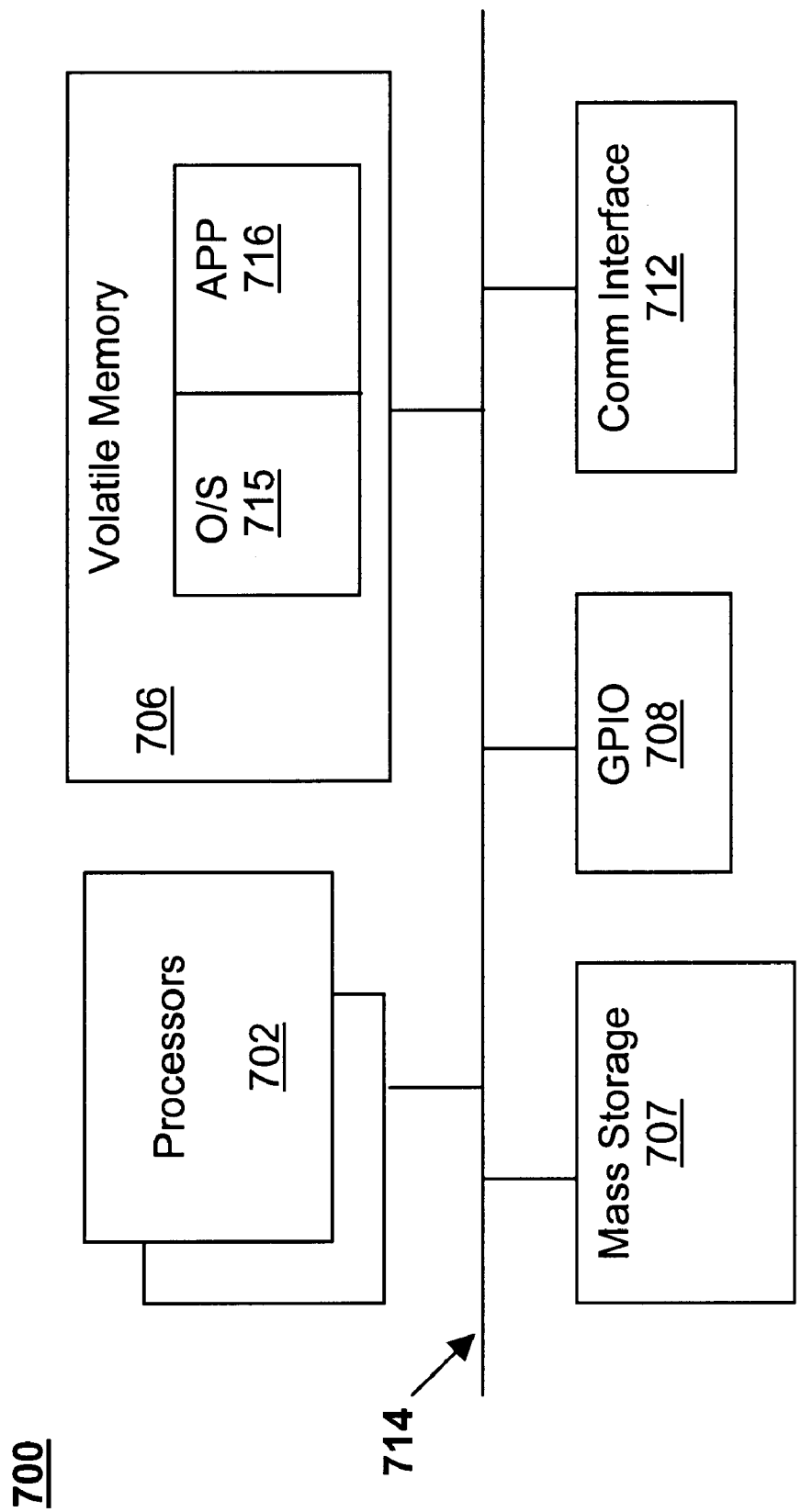
FIG. 7 illustrates an example computer system suitable for use as client computer 108 and/or web server 128.

Client 108 is intended to represent a broad category of internet telephony enabled devices such as a computer system, palm sized personal digital assistants (PDA), Internet appliance, set-top box, and so forth. FIG. 7 (described below) illustrates an exemplary computer system that may be used as client 108. As illustrated in FIG. 1, client 108 is communicatively coupled to ISP 112 via network connection 110. In turn, ISP 112 is coupled to Internet 150 via direct connection 114, and is coupled to PSTN 140 via PSTN extension 115 and communication line 113. Accordingly, client 108 may communicate with a variety of devices coupled to PSTN 140 and/or Internet 150 by way of ISP 112. Client 108 may further be coupled to PSTN 140 and/or Internet 150 through connections unrelated to ISP 112. For example, client 108 may be coupled to PSTN 140 by way of PSTN extension 119 and communication line 121 as shown. Similarly, client 108 may be coupled to Internet 150 by way of one or more other direct or indirect connections (not shown).

Handsets 117 and 142 are intended to represent a broad category of conventional telephone handsets known in the art, including but not limited to desktop handsets, cordless handsets and wireless handsets. Handset 142 is coupled to PSTN 140 through PSTN extension 143 and communication line 144, whereas handset 117 is coupled to PSTN 140 through shared PSTN extension 119 and communication line 121. In the illustrated embodiment, handset 117 is associated with client 108. That is, handset 117 and client 108 are considered to be collocated and may even be coupled to one another (through e.g. a MODEM).

Communication lines 113, 114, 144, and 121 may simply be plain old telephone service (POTS) communication lines, although other types of communication lines may be used. For example, communication line 121 may be an integrated service digital network (ISDN) line, whereas communication line 113 may be a T1 (1.533 Mbps) or an E1 (2.0488 Mbps) trunk line. Each of communication lines 144 and 121 may further be a wireless cellular connection, a Personal Communication Services (PCS) connection, and the like.

Internet 150 includes a number of local and/or global networks interconnected by routers to communicatively couple the various client computers, web servers and bridgeports of FIG. 1 together. PSTN 140 on the other hand, includes a number of Service Switching Points (SSP), Signal Transfer Points (STP), and Service Control Points (SCP) coupled to each other (not shown). PSTN extension 143 is coupled to a "local" SSP of PSTN 140 through communication line 144. The "local" SSP in turn is coupled to a number of other "local" PSTN extensions, including for example, PSTN extension 115 assuming ISP 112 is a "local" ISP served by the same SSP. In addition, the "local" SSP is also coupled to an associated STP, which in turn is coupled to other "remote" SSPs. Each of the "remote" SSPs is coupled to a number of "remote" PSTN extensions, including for example, extension 119 assuming handset 117 is a "remote" handset served by a "remote" SSP.

Bridgeports 162 and 165 are coupled to Internet 150 through network connections 164 and 167 respectively, and to PSTN 140 through communication lines 163 and 166 respectively. In accordance with one embodiment, each of bridgeports 162 and 165 represent a bridge server to bridge voice calls between two endpoints. In one embodiment, at least one of bridgeports 162 and 165 facilitate establishment of a voice call between two PSTN extensions, whereas in another embodiment, at least one of bridgeports 162 and 165 operate to facilitate establishment of a voice call between a VOIP equipped device (e.g. client 108) and a PSTN extension (e.g. handset 142). In accordance with one embodiment of the invention, each of bridgeports 162 and 165 further include services to determine an appropriate one of the community of Internet/PSTN changeover servers (e.g., bridgeports 162 and 165) to bridge the voice calls. Additional details regarding the functionality of bridgeports 162 and 165 may be found in U.S. Pat. No. 5,889,774, titled "Method and Apparatus for Selecting an Internet/PSTN Changeover Server for a Packet Based Phone Call" (having a common assignee with the present application), which is hereby incorporated by reference.

Web server 128 is coupled to Internet 150 through connection 130, but may also be coupled to PSTN 140 by way of additional connections (not illustrated). In one embodiment, web server 128 is an Internet portal. In alternate embodiments, web server 128 may be a e-commerce site or a corporate presence web server. Web server 128 includes services to generate an electronic collect calling button, whose selection would cause at least one of bridgeports 162 and 165 to establish and facilitate a voice communication session between two parties based at least in part upon data provided by one of the parties (e.g. client 108). Further, at least a subset of the costs associated with one or more voice communication sessions established between a call-initiating party (i.e. caller) and a designated call-receiving party (i.e. callee) will be charged to the callee rather than the caller. Typically, the electronic collect call button is disposed in a content page of web server 128. The services in support of the inclusion of the electronic collect call button is executed on web server 128, whereas the services in support of the communication with bridgeports 162 and 165 to facilitate the establishment of the collect call is embedded with the content page and executed on the caller's computing device. However, in alternate embodiments, the services in support of the communication with bridgeports 162 and 165 to facilitate the establishment of the collect call may be executed on web server 128 instead. For the purpose of this discussion, the party that causes a collect calling token to be generated is referred to as the caller/offeror, whereas the party that is charged with costs associated with the collect call is referred to as a callee/offeree.

In one embodiment, the embedded services (or hosted services on web server 128) generate a collect calling token based at least in part upon calling information provided by the caller. Each collect calling token may contain various amounts of contact information. In one embodiment, the collect calling token is self-describing in that it has encoded within it, all contact information necessary to facilitate a call between two parties, such as a caller and a callee. Such contact information may include PSTN extensions and/or IP addresses of the caller, the callee, and the bridgeport used to bridge the two calls. In the case of a self-describing electronic token, the bridgeport need not be notified of the electronic token's existence except upon the collect calling token becoming activated. In an alternative embodiment, the collect calling token has encoded within itself less than all necessary contact information. For example, in a basic implementation, the collect calling token may only include a bridgeport address and a call identifier identifying the callee. The bridgeport, whose address is encoded within the collect calling token, stores the remaining contact information in association with the call identifier. When the collect calling token is activated, the identified bridgeport is contacted and the bridgeport performs a lookup to correlate the stored contact information with the call identifier. A collect calling token may be activated by e.g. a user selecting or "clicking" on a graphical representation of the token with a user input device such as a mouse. In one embodiment of the invention, the electronic token is implemented as an extended markup language (XML) data structure, however, the electronic token may also be implemented as a standard generalized markup language (SGML) data structure, or in other embodiments, other programming languages may be used. FIG. 8 illustrates an exemplary XML data structure representing an electronic token according to one embodiment of the present invention.

In the event the collect calling token is generated by e.g. hosted services of web server 128, the collect calling token may be transmitted by web server 128 to the caller for subsequent activation by the caller, or the collect calling token may be transmitted to a bridgeport, which utilizes the calling token to automatically (i.e. without further human intervention) initiate the requested collect call upon its receipt. In an embodiment where web server 128 additionally includes bridgeport functionality, web server 128 may automatically initiate the requested collect call upon generation of the collect calling token.

Figure 2:
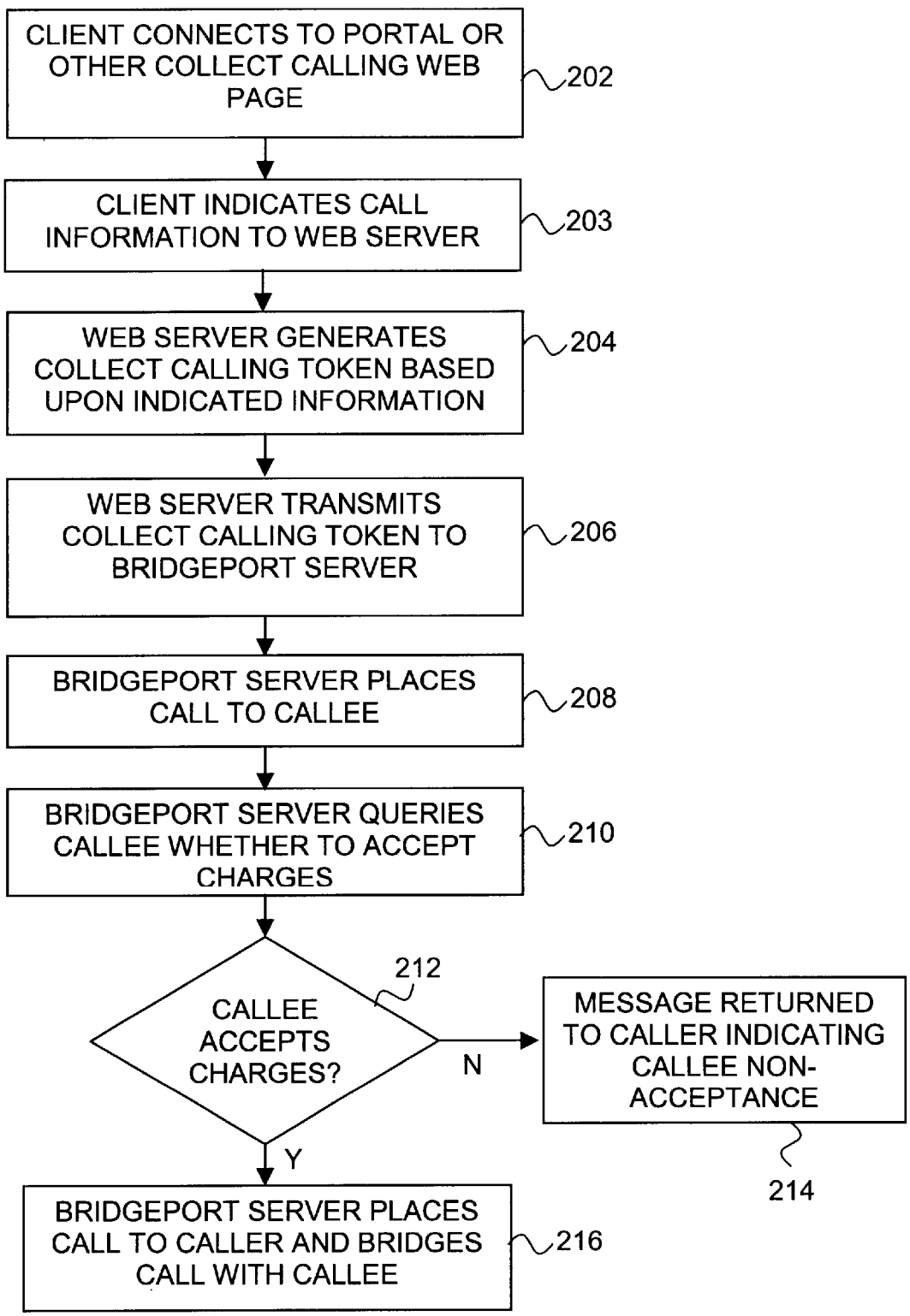
FIG. 2 illustrates one embodiment of an operational flow of the present invention in which a PSTN to PSTN collect call is to be established.

FIG. 2 illustrates one embodiment of an operational flow of the present invention in which a PSTN to PSTN collect call is to be established. The process begins at block 202 where an offeror client computer, such as client 108, connects to Internet 150 (via e.g. ISP 112) and accesses one or more web pages presented by web server 128 (e.g. as shown in FIGS. 4(A–B). In accordance with the teachings of the present invention, web server 128 presents one or more "web pages" to client 108 to facilitate the provision of call related data by client 108. For example, web server 128 may project one or more web pages including one or more hypertext elements, such as text boxes, radio buttons, drop-down menus and so forth, including in particular, the earlier described electronic collect call button, through which client 108 may interact to provide call-related information.

At block 203, client 108 identifies such call related information to facilitate generation of the collect calling token of the present invention. The call related information might include information identifying the party to be called (i.e. callee), the calling party (i.e. caller), as well as the type of call to be placed. In one embodiment, the callee is identified by the PSTN extension (or other alphanumeric identifier) associated with the callee. In another embodiment, the callee is identified from a list of possible callee candidates presented to the caller. In the illustrated embodiment (i.e. involving a PSTN to PSTN based voice call), client 108 identifies both a PSTN extension associated with the callee to be called and a PSTN extension associated with the caller (i.e. client 108) to web server 128.

Once client 108 has indicated the various call information, the embedded services (or hosted services on web server 128) generates the collect calling token representing the indicated information for transmission across e.g. Internet 150, block 204. In one embodiment, the collect calling token is generated as an extended markup language (XML) based data structure utilizing encoded representations of the calling information indicated by the callee. Next, the collect calling token is transmitted to an identified bridgeport, block 206. In one embodiment, the bridgeport is identified by client 108, whereas in another embodiment, the bridgeport is identified by web server 128 based upon the identity of the callee as provided e.g. by the caller. For example, web server 128 may identify the bridgeport as being best equipped amongst a plurality of bridgeports to bridge a call between the caller and the callee. Such a determination may be made based upon the PSTN extension associated with the callee, the PSTN extension associated with the caller, or the geographic location of the caller and/or callee, for example.

Upon receiving the collect calling token, the bridgeport places a first voice call to the PSTN extension of the identified callee, block 208. The PSTN extension of the callee may be encoded within the collect calling token, or the bridgeport may perform a lookup to determine the appropriate PSTN extension of the callee. In the event the callee answers the call, the bridgeport further queries the callee as to whether they wish to accept costs associated with the voice communication session to be established between the caller and the callee, block 210. For example, upon the callee answering the call from the bridgeport, the bridgeport may announce a message to the callee such as "Bob is attempting to make a collect call. If you wish to accept the costs associated with completing this call press or say '1'. If you do not wish to accept the costs, press or say '2'." Thus, the callee may agree or disagree to accept the charges as they so desire. In accordance with the illustrated embodiment, if the callee does not agree to accept the charges (block 212), the bridgeport notifies the caller that the callee did not accept the charges, block 214. Such a non-acceptance notification may be transmitted directly to client 108 in the form of an audio, text and/or graphical representation (using e.g. the IP address of client 108). However, if the callee manifests their intent to accept the charges (block 212), the bridgeport server places a voice call to the PSTN extension associated with the caller (e.g. as stipulated by the collect calling token) and bridges that call with the voice link established between the bridgeport and the callee, block 216.

Figure 3:
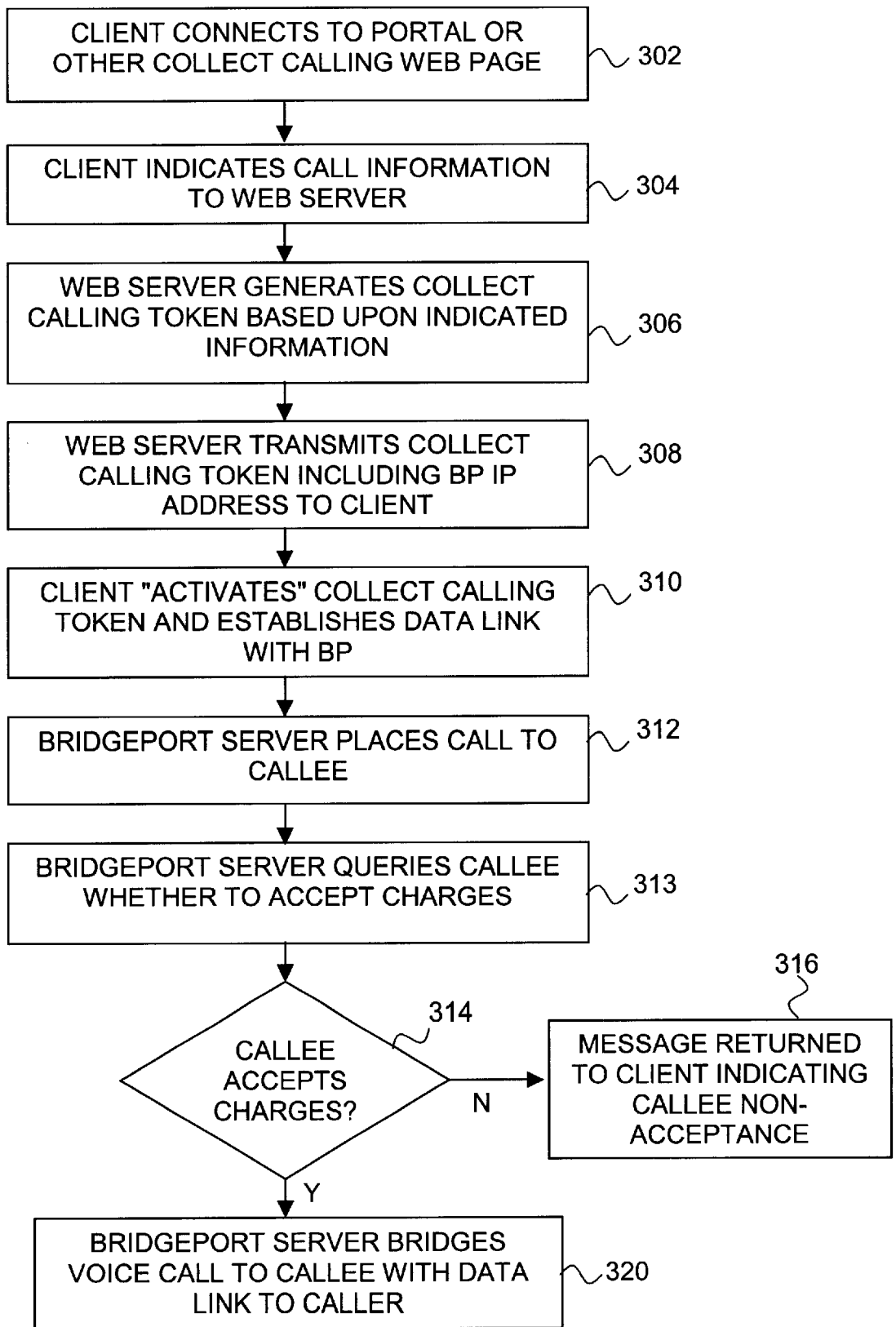
FIG. 3 illustrates an operational flow of a VOIP to PSTN collect call in accordance with one embodiment of present invention.

FIG. 3 illustrates an operational flow of a VOIP to PSTN collect call in accordance with one embodiment of present invention. As was described above with respect to FIG. 2, the process depicted in FIG. 3 also begins with a client connecting to Internet 150 and accessing one or more web pages presented by the web server, block 302. At block 304, the client indicates call related information to the web server through e.g. one or more graphical dialogs such as those shown below in FIGS. 4(A–B). Once the indicated call information is provided, web server 128 generates a collect calling token, block 306. In the illustrated embodiment, once the collect calling token is generated, it is transmitted to the client (block 308) rather than to the bridgeport as was the case in the process flow of FIG. 2. In one embodiment, the token is linked to a graphical "button" displayed as one component of a web page projected to the client (i.e. via HTTP) by the web server. In an alternative embodiment, the collect calling token may be emailed to the client (i.e. via SMTP) for subsequent activation.

Upon the client activating the collect calling token, a data connection is established between the client and the bridgeport identified by the token (i.e. via the bridgeport's IP address), block 310. Once the bridgeport has been contacted by the client, the bridgeport establishes a voice call to the callee also indicated by the token, block 312. In the event the callee answers the call, the bridgeport server further queries the callee as to whether they wish to accept any costs associated with the communication session to be established between the caller and the callee, block 313. In accordance with the illustrated embodiment, if the callee does not agree to accept the costs (block 314), the bridgeport returns a message to the caller indicating that the callee did not accept the costs, block 316. However, if the callee agrees to accept the costs (block 314), the bridgeport server bridges the voice link established between the bridgeport and the callee with the data link established between the bridgeport and the client to place the client and the callee in voice communication with each other, block 320.

Figure 4A:
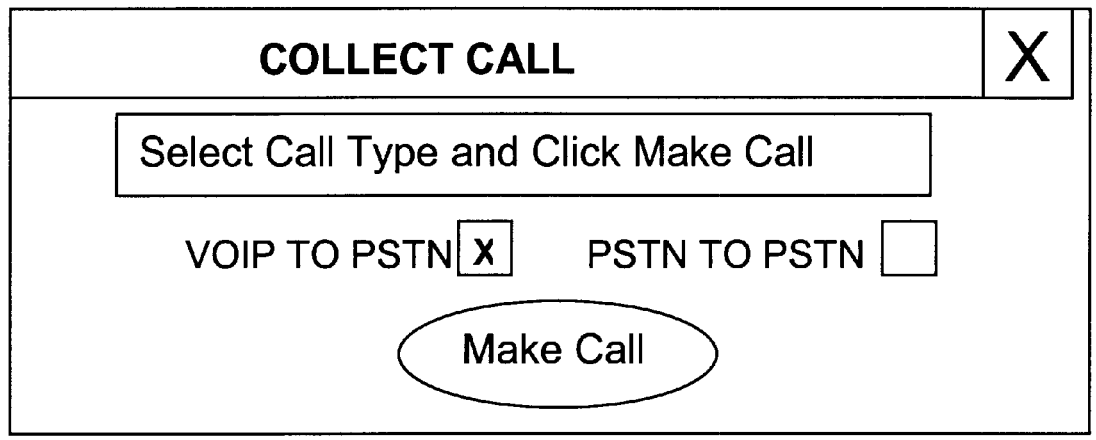
FIGS. 4(A–B) illustrate various exemplary graphical dialogs that may be presented by a web server to solicit call-related information from a caller including information reflecting the type of call to be established as well as the identity of the callee and the caller.

FIGS. 4(A–B) illustrate various exemplary graphical dialogs that may be presented by a web server to solicit call-related information from a caller including information reflecting the type of call to be established as well as the identity of the callee and the caller. More specifically, FIG. 4A illustrates a graphical dialog that may be presented by a web server such as web server 128, to enable a caller to select the type of call to be established. In the illustrated embodiment, the caller may choose from a VOIP to PSTN based call and a PSTN to PSTN based call.

Figure 4B:
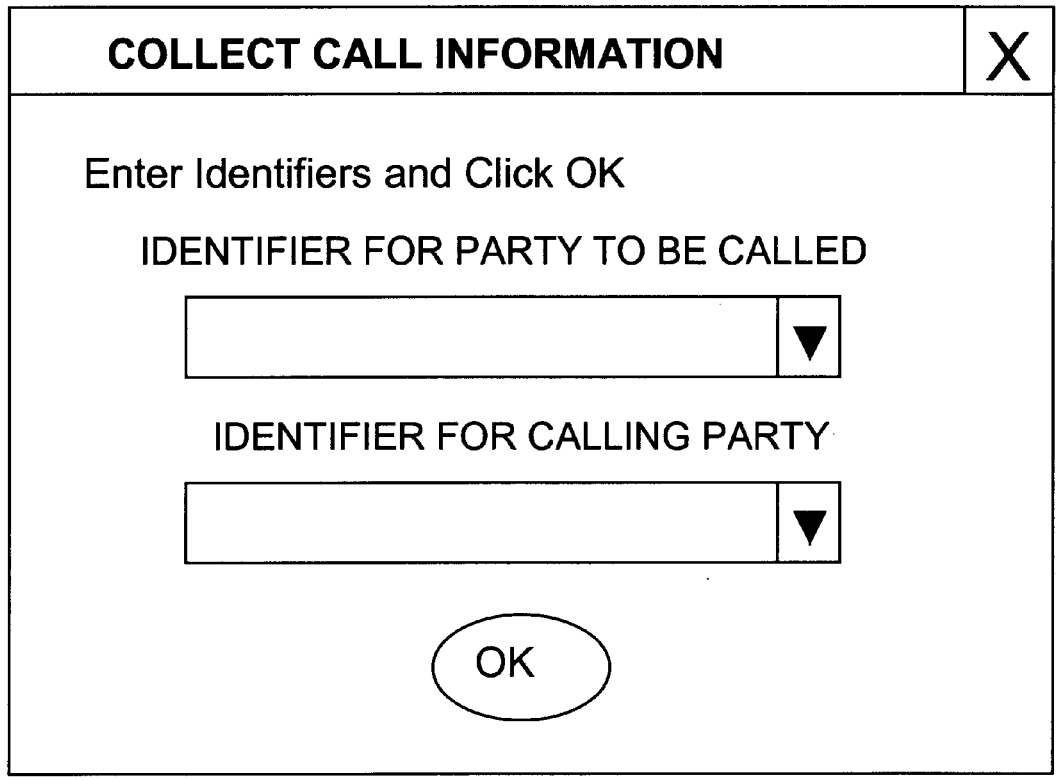

FIG. 4B illustrates a graphical dialog that solicits call information related to the identity of the callee, and optionally the identity of the caller. As described above, the callee may be identified through provision of an alphanumeric identifier, such as a PSTN extension known to be associated with the callee, or by way of the callee's name. In one embodiment, the web server hosting the illustrated dialog presents a list of potential callees to the caller as maintained e.g. in a database. The list of callees may be provided by the hosting web server as part of a subscription based service in which subscribing callees register their names along with one or more associated PSTN extensions. The dialog depicted in FIG. 4B additionally illustrates a data entry mechanism whereby the caller may provide an identifier representing e.g. a PSTN extension they wish to have called when establishing a PSTN to PSTN based voice call.

Although the previously illustrated embodiments describe a process whereby the callee is queried before accepting costs associated with a voice communication session, there may be times when it is not convenient for the callee to be queried as such. Therefore, in accordance with one embodiment of the invention, the callee is provided with the ability to preauthorize costs associated with one or more voice communication sessions to be established between one or more callers and the given callee. Accordingly, the callee need not be queried each time a preauthorized caller or a caller associated with a preauthorized PSTN extension initiates a call with the callee.

Figure 5:
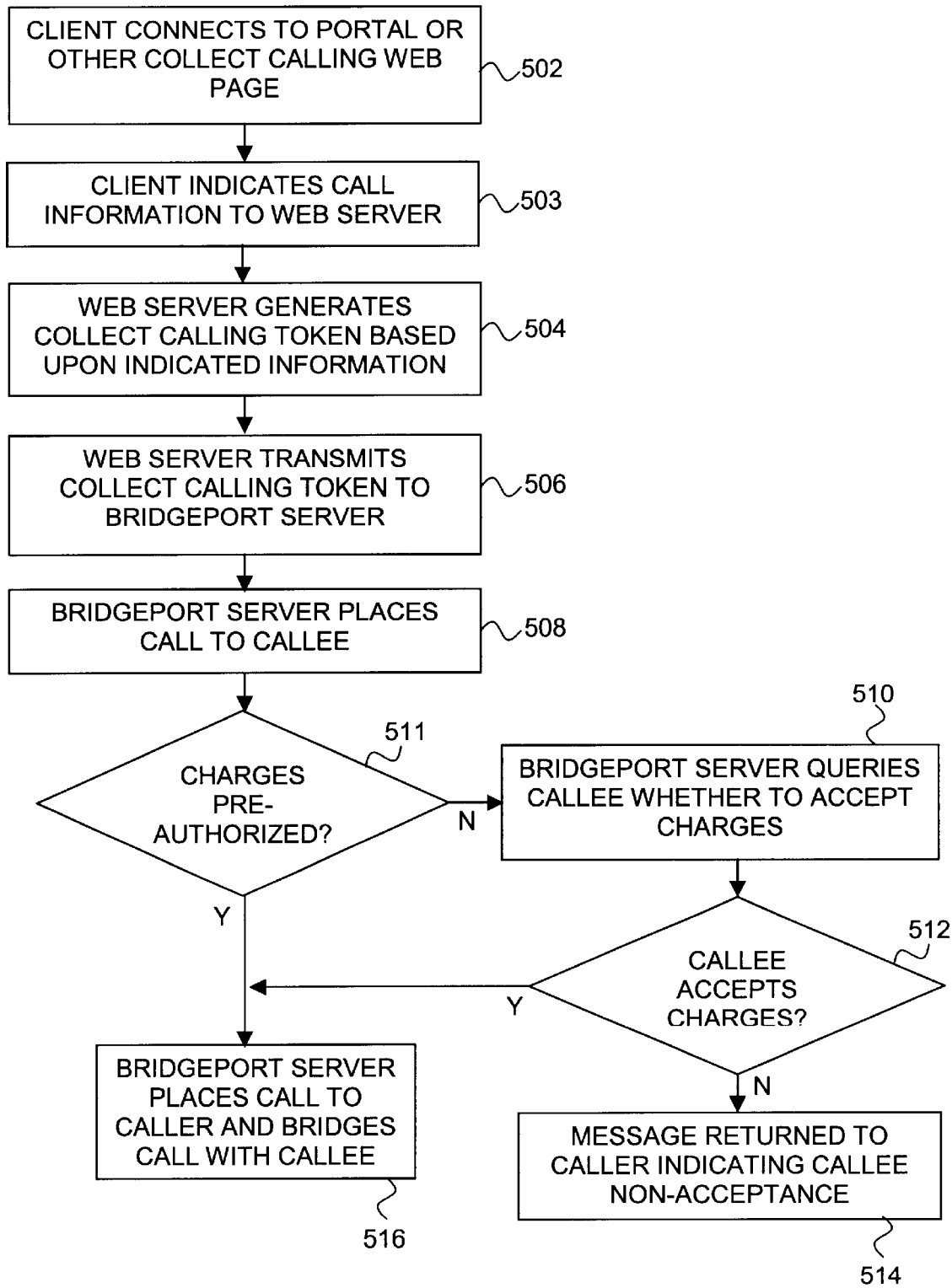
FIG. 5 is an operational flow diagram illustrating the preauthorization aspect of the present invention, in accordance with one embodiment in which a PSTN to PSTN collect call is to be established.

FIG. 5 is an operational flow diagram illustrating the preauthorization aspect of the present invention, in accordance with one embodiment in which a PSTN to PSTN collect call is to be established. The process is similar to that described above with respect to FIG. 2 and begins with a client connecting to Internet 150 and accessing one or more web pages presented by the web server, block 502. Through the web pages, the client indicates call related information to the web server (block 503), which is then used to generate a collect calling token, block 504. Once the web server has generated the collect calling token, the web server transmits the collect calling token to an identified bridgeport, block 506, which then places a first voice call to an indicated PSTN extension of the callee, block 508.

Once the bridgeport has placed the first call to the callee, the bridgeport determines if the callee has preauthorized (i.e. authorized in advance) costs associated with the voice communication session to be established between the indicated caller and the callee be charged to the callee, block 511. In one embodiment, the callee preauthorizes such charges through one or more graphical dialogs presented to the callee by web server 128. An indication of the callee's preauthorization may then be encoded within the collect calling token in the form of a tag generated by the web server. FIG. 6 illustrates an exemplary graphical dialog through which a callee may provide billing information such as an account name and password (i.e. for a subscription based service), or credit card information against which the costs of a preauthorized communication session should be charged.

Continuing again with FIG. 5, if at block 511 it is determined e.g. by examination of the collect calling token that the callee has preauthorized the costs associated with the pending voice communication session, the bridgeport server places a voice call to the PSTN extension associated with the caller and bridges that call with the voice link already established between the bridgeport and the callee, block 516. However, if the callee has not preauthorized the charges associated with the communication session to be established, the bridgeport queries the callee as to whether they wish to accept the costs associated with the voice communication session to be established between the caller and the callee, block 510. If the callee then accepts the responsibility for paying the charges, the bridgeport bridges the respective calls to place the two parties in voice communication with each other (block 516). However, if the callee does not accept the responsibility to pay the costs, the caller is notified accordingly, block 514.

Although the present invention finds wide applicability with respect to domestic communication sessions, the present invention also proves advantageous to International communication sessions where a caller is based in one country and a callee is based in another country. This especially may be the case if the caller is located in a country where VOIP communications are deemed illegal or are otherwise not allowed. That is, by activating a collect calling token of the present invention, a caller located in one country may effectively initiate, via a packet based network, a collect PSTN to PSTN based call to a callee located in another country, while the costs of the call are billed to the callee at the (presumably) lower rates of the callee's country.

For example, in accordance with the teachings of the present invention, a caller located in a first country such as India would be able to gain access, by way of a local service provider (ISP), to a web server projecting a collect calling token of the present invention. The caller could then activate the collect calling token, which would initiate an HTTP based connection to a bridgeport that is located in a second country such as the U.S. The bridgeport would either provide the caller with the bridgeport's own IP address such that a TCP/IP connection could be established between the caller and that bridgeport, or the bridgeport would provide the caller with the IP address of a second bridgeport, such that a TCP/IP connection could be established between the caller and the second bridgeport. In accordance with one embodiment of the invention, the first bridgeport identifies a second bridgeport that is most proximate the first country without actually being located within the first country. For example, a first bridgeport located in the U.S. may identify and contact a second bridgeport that is located just outside (i.e. neighboring) the country of the caller.

Assuming the bridgeport returned its own IP address to the caller, the bridgeport would proceed to place a first PSTN based call to the callee in order to ascertain whether the callee wishes to accept the costs associated with the pending communication session with the caller. If the callee accepts the costs, the bridgeport would then place a second PSTN based call to the caller and subsequently bridge the two parties. However, assuming that the bridgeport returned the IP address of the second bridgeport, the second bridgeport would proceed to place a first PSTN based call to the callee in order to ascertain whether the callee wishes to accept the costs associated with the pending communication session with the caller. If the callee accepts the costs, the second bridgeport would then place a second PSTN based call to the caller and subsequently bridge the two parties. Whether the first bridgeport or the second bridgeport ultimately bridges the first and second calls, the result is that both calls are initiated from the second country (e.g. U.S.). Thus, the rates charged in association with the communication session will be determined as if it were a call that was initiated from the second country. Furthermore, since the bridgeport places the PSTN call into the first country, there are no regulatory concerns with the communication session being treated as a VOIP call originating from the first country even though the voice calls were initiated in the first country via a packet based network.

FIG. 7 illustrates an example computer system suitable for use as client computer 108 and/or web server 128. As shown, system 700 includes one or more general purpose or special purpose processors 702, and system memory 706. Additionally, computer system 700 includes mass storage device(s) 707 (such as diskette, hard drive, CDROM and so forth), input/output devices 708 (such as keyboard, cursor control and so forth) and communication interface(s) 712 (such as network interface cards, modems and so forth). The elements are coupled to each other via system bus 714, which represents one or more buses. In the event that system bus 714 represents multiple buses, the buses are bridged by one or more bus bridges (not shown). System memory 706 and mass storage device(s) 707 are employed to respectively store a working copy and a permanent copy of the programming instructions implementing the collect calling services of the present invention. Additionally, system memory 706 includes an operating system 715 with internetworking communication and socket services, and one or more telephony applications 716.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising: receiving by a web server over a first data link, a request by an offeror computer system to cause a voice communication session to be established between the offeror computer system and a PSTN extension associated with an indicated offeree, said web server generating an electronic token in response to said request and transmitting said electronic token to the offeror computer system, the offeror computer system sending said electronic token to a bridge server via a second data link and requesting said bridge server to establish and facilitate a voice communication session between said offeror computer system and the PSTN extension associated with said offeree based at least in part upon information associated with said electronic token; the bridge server selecting one from a plurality of Internet/PSTN changeover servers capable of establishing voice communications between the offeror and the offeree over PSTN, the selected changeover server causing a first voice call to be made to the PSTN extension associated with the offeree, said first voice call including an offer for the offeree to assume charges associated with the voice communication session, and in response to the offeree accepting said offer to assume charges, the selected changeover server causing a second voice call to be made to said offeror over a third data link and bridging said first voice call with said second voice call to place said offeror and offeree in voice communication with one another.

* * * * *